Jan. 12, 1971   R. E. BOOSTROM ET AL   3,554,648
COMBINATION TEACHING AID AND MODULAR INSTRUMENTAL ANALYSIS
SYSTEM AND COMPONENTS THEREFOR
Filed Dec. 29, 1967   7 Sheets-Sheet 1

INVENTORS
ROY E. BOOSTROM
ARMAN MANDELL
LEWIS MALTER
ATT'YS.

INVENTORS
ROY E. BOOSTROM
ARMAN MANDELL
LEWIS MALTER

United States Patent Office 3,554,648
Patented Jan. 12, 1971

3,554,648
COMBINATION TEACHING AID AND MODULAR INSTRUMENTAL ANALYSIS SYSTEM AND COMPONENTS THEREFOR
Roy E. Boostrom, Elmhurst, Arman Mandell, Chicago, and Lewis Malter, Morton Grove, Ill., assignors to Sargent-Welch Scientific Company, Skokie, Ill., a corporation of Illinois
Filed Dec. 29, 1967, Ser. No. 694,517
Int. Cl. G01j 3/42, 3/48; G09b 23/24
U.S. Cl. 356—96
11 Claims

ABSTRACT OF THE DISCLOSURE

A combination teaching aid and modular instrumental analysis system in which a plurality of modules are provided, each having a separate function, and in which the different modules are adapted to be place together in different combination to provide different optical analysis instruments. The modules include a light source for providing light, a detector module for receiving light which has been exposed to a sample compartment module which receives one or more samples to be analyzed, and may include display means in the form of a meter or the like for reading the output of the detector module. The combination may also include a monochromator unit for providing substantially monochromatic light, and a filter module which is adapted to contain one or more filters through which a light beam may be passed for obtaining a beam of desired frequency.

Different arrangements of the various modules will produce a spectrophotometer, a filter photometer, or a nephelometer. The described module units are arranged so that at least some of them may be disposed on a base and optically aligned by means of combination adjusting and clamping means, so that the units may be thereafter moved, or replaced as desired without affecting the alignment thereof. The described units are constructed and arranged so that all the significant operational and functional properties of each module may be directly observed by the student. Therefore, each module is adapted to perform a minimum number of functions, and the modular concept and the construction features are used as a teaching aid used to emphasize the relation between various systems of optical instrumental anaylsis.

The filter compartment module and the sample compartment module include holder means for holding light filters or sample units, and the holder unit is constructed so as to facilitate interchange of sample holders and filter units, and to be adapted for use without change to perform different functions in different instrumental combinations.

BACKGROUND OF THE INVENTION (1) Field of the invention

The field of the present invention is that of modular instrumental analysis systems in which a plurality of separate modules are particularly adapted to be arranged to form a variety of different optical instrumental analysis units, each of which instrument contains one or more common units. The present invention is useful, not only as a laboratory instrument, but also as a teaching aid, since the design thereof is such that individual operational or functional features or characteristics of each unit are maintained separate from each other, and are constructed and arranged within the units so that the operation thereof may be readily observed by a student. The described modules are sufficient to create instruments which will allow determinations to be made by nephelometry, colorimetry, turbidimetry or spectrophotometry.

The modular components include light source means, monochrometer means for breaking up light into monochromatic portions, a sample compartment for holding a plurality of samples, or holding one individual sample, filter compartment for accommodating means for holding one or more color filter units, and a detector unit for determining characteristics of a light beam transmitted thereto. In addition, the system includes a base for supporting different modules, and each module contains supporting means which facilitate alignment thereof in regard to the other modules, since alignment of the modules is obviously desirable in any optical instrumental analysis system.

In addition, the invention includes specially designed components, particularly a novel holder unit for holding optical filters as well as sample containers, and the holder units are adapted to assist in obtaining rapid anaylsis and standardization as well as change of function without change of mode of operation thereof, or change of location within the unit.

The system also includes a power supply unit, and visible display means in the form of a meter or the like, which is adapted to be used with the detector module in order to display the information received by the detector unit.

(2) Description of the prior art

Instruments such as those which may be made by assembling the modules of the present invention in and, to a certain extent, the concept of modular construction of instruments having common functional elements or components has been known. In addition, it is known that certain optical analysis instruments include common components, since such instruments depend on utilization of a light source and detection of one or more of the characteristics of a beam of light which is effective in some way by passage through, or by reflection or scattering from, a sample unit whose properties will in some way be indicated by the effect of an incident light beam thereon.

Since the advent of reliable analysis instruments, it has been increasingly common in industry and other fields to perform chemical analysis by instrumental methods, and accordingly, there has been a substantial demand for competent teaching in the area of instrumental chemical analysis, and, as a corollary thereof, there has been a demand for teaching aids which would simplify the task of instructing students in the fundamental similarities and differences in various analysis techniques as well as the basic theories underlying such systems.

Almost all commercially available analysis instruments are designed to perform only one analytical operation, and, since many such instruments are sold competitively, they are normally designed having an object in mind of minimum cost, maximum copactness and with a view towards ruggedness and dependability, which normally implies that delicate components thereof be shielded from dust, dirt and other contamination, and from the possibility of damage by handling and the like. Thus, the normal analytical instrument used for optical analysis is not suited for use as a teaching aid, since the manner of its operation is not readily apparent from viewing the instrument itself, functional components being generally hidden from view.

Likewise, modular instrumental systems heretofore known have generally been designed with the idea of economy as a primary purpose, and the design of such systems has emphasized minimum duplication of parts. Such modular instrument systems accordingly were not designed witth the object in mind of laying out the components in the logical manner in which each operation took place, but were generally designed with the view that such units should be made compact and, where possible, include single components which could be used to perform several functions in the same instrument.

Thus, the prior art has not heretofore disclosed a simple and economical modular system in which the parts may not only be assembled to make different optical analysis instruments, but may be simply and accurately arranged, removed, placed into different combination, and replaced without the need for individual adjustment, and which systems also possess sufficient accuracy for classroom work, for use in an analytical laboratory, or for industrial use. Thus, the present invention combines the accuracy of a laboratory instrument at comparable cost, and also includes special design features making possible great simplicity in handling of filters and samples, as well as in handling of the modules containing the units, all in a system which is expressly designed to be observed and studied with relation to the theoretical bases underlying the operation of optical instrumental analysis.

SUMMARY OF THE INVENTION

In view of the fact that no such combination instrument having the capability of being readily adaptable to classroom instruction, modular use, rapid and simple assembly and reassembly, combined with good accuracy at low cost has been available, an object of the present invention is to provide a modular instrumentation system which includes a plurality of modules which may be arranged in different combinations to provide different instruments.

Another object is to provide a modular system which includes means for mounting and alignment which simplifies the disposition of various parts in desired relation to each other to make such instruments.

A further object is to provide a modular instrument system in which the operations carried out by each module may be simply and readily observed by a student and be readily demonstrated by an instructor.

A further object is to provide a system in which a single detector module means may be used with a common display means for indicating the condition of a system.

Another object is to provide a simplified means for holding sample containers and filter elements, so that such elements may be locked in a desired relation for standarization or observation, rotated to other positions, and held in place against rotation while being observed or compared, and in which such holder is constructed and arranged to allow light passage therethrough along two different axes.

Another object is to provide a plurality of modules wherein access may be had to the interior thereof in a simple manner for study of the components thereof.

Another object is to provide a modular instrument analysis and teaching aid system in which the components may be held together in various assembled relationships by simple but effective means which do away with the need for frequent adjustment.

The present invention accomplishes these objects, and others which are inherent therein, by providing a combination teaching aid and modular instrument analysis system which includes a light source module for producing light and which includes light emitting means therein, a sample compartment for receiving sample containers of a material to be analyzed, a detector module for receiving light directed from the light source into the sample compartment and thence into the detector module, wherein the detector module has a photoresponsive means which possesses an output variable in response to the characteristics of the light supplied to the detector. The invention additionally provides monochromator means as well as filter compartment means, each in a separate module for use in the system. The invention also provides a base unit for receiving and supporting such modules, for facilitating alignment and adjustment thereof, and provides holder means for samples and filters which holders are adapted to allow maximum versatility in manipulating and locating samples and filters with a maximum of simplicity and reliability.

The manner in which the invention achieves its objects will be more fully understood when considered in conjunction with a more complete description of the preferred embodiments of the invention, and as shown in the drawings, in which like reference numerals indicate corresponding parts throughout.

DESCRIPTION OF THE PREFERRED EMBODIMENTS

Figures 1, 2, 3:
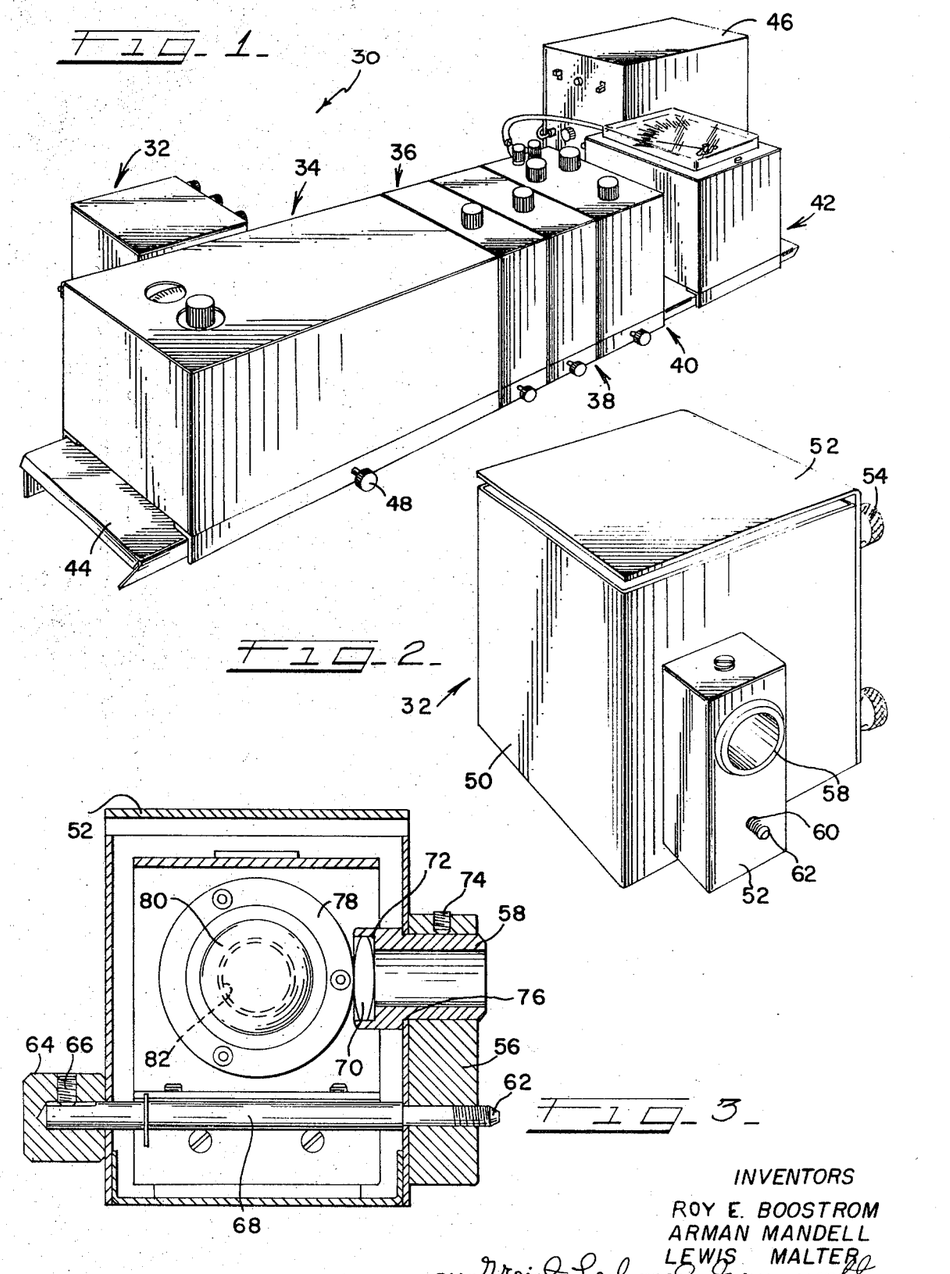
FIG. 1 is a perspective view showing the arrangement of a typical instrument made with the modules of the invention, including a power supply module, a light source module, a monochromator module, a filter compartment modules, a sample compartment module and a detector module with a meter associated therewith.
FIG. 2 is a perspective view of the light source module of the present invention.
FIG. 3 is a vertical sectional view of the light source module of the present invention, showing fastening means thereon.
Figure 4:
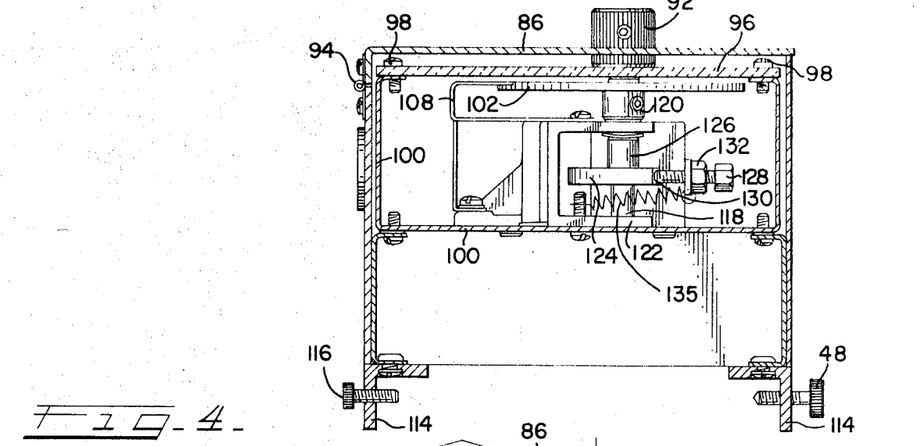
FIG. 4 is an isometric view of the monochlorator module of the present invention.

Referring now to the drawings in greater detail, FIG. 1 shows an array 30 of modules disposed in position to form a typical analysis instrument. FIG. 1 shows that such an instrument may include a light source module 32, a monochromator unit 34, a filter compartment module 36, a sample compartment 38, a detector module 40 and a meter means 42, all of said instruments being attached to a base unit 44. A power supply module 46 is shown to furnish power to the meter 42, and to the detector module 40, and the power supply module 46 also supplies power to the light source module 32.

LIGHT SOURCE MODULE

Referring now to FIG. 2, the light source module 32 is shown to include a housing 50, a cover element 52 held in place by thumb screws 54 and a mounting block 56 disposed on one side thereof. This mounting block includes a cylindrical extension tube 58, and has an opening 60 therein allowing passage therethrough of a fastener in the form of a mounting screw 62.

Referring now to FIG. 3, the structure of the mounting block 56 is shown, and FIG. 3 also shows that the mounting screw 62 contains knob means 64 on one end thereof, which is locked by a set screw 66 onto the shaft 68 of the screw 62. In addition, a condensing lens 70 is held in place in a shoulder 72 in the tube 58, which in turn is mounted by a set screw 74 in the mounting block 56. Thus, the cylinder and condenser lens 58, 70 are disposed in registry with an opening 76 in a side wall of the light source module. FIG. 3 also shows the disposition of a mounting flange 78 which holds a bulb unit 80 in place, with the base thereof received in a socket 82.

In operation, it will be seen that the cylindrical tube 58 is adapted to be placed in registry with a side wall opening on an adjacent module unit, and manipulation of the knob 64 serves to hold the light source module locked in the desired position.

MONOCHROMATOR MODULE

Referring now to FIGS. 4 through 7, the monochromator unit of the invention is shown. This unit includes housing means 84, a top cover unit 86, having a dial indicator opening 88, a knob opening 90 through which a wavelength adjustment knob 92 protrudes, fastening means 48 on the front portion thereof, and hinge means 94 enabling the top 86 thereof to be opened.

Figure 5:
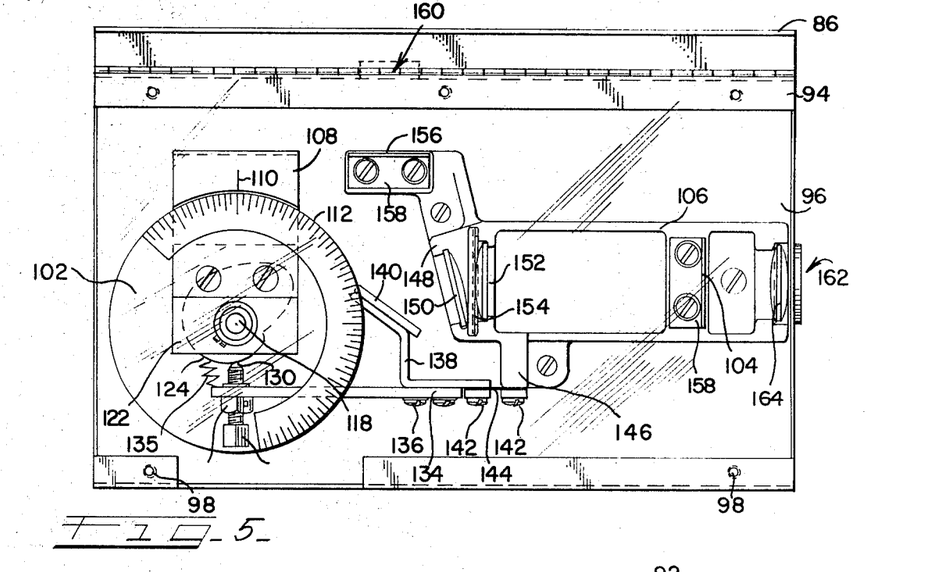
FIG. 5 is a top plan view of the monochromator module of FIG. 4 with the top cover thereof raised, and illustrating the interior components thereof.

As shown in FIG. 5, when the top cover 86 moves upwardly about the axis of the hinge 94, a transparent cover plate 96, made for example, of polymethyl methacrylate clear plastic material or the like is exposed, and this plastic cover plate 96 is supported by fasteners 98 carried by an inner frame unit 100. FIG. 5 shows means in the form of a wheel 102 for indicating the wavelength of a light beam diffracted onto an exit slit 104 supported on an optical alignment frame 106, carried by the inner frame unit 100 of the monochromator unit. A flange unit 108 is provided for locating an indexing marker 110 thereon so that calibrations 112 on the wheel 102 may be aligned therewith to determine the wavelength of light diffracted and propagated through the exit slit 104 by the monochromator.

Figure 6:
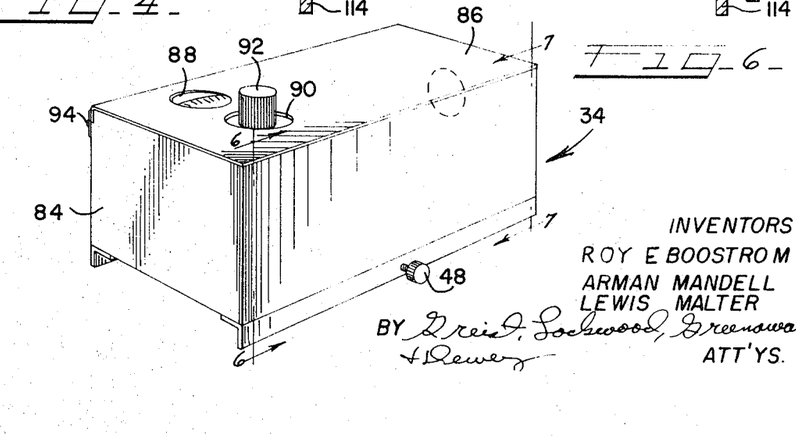
FIG. 6 is a vertical sectional view, taken on line 6—6 of FIG. 4, showing the monochromator module.

As best shown in FIG. 6, leg means 114 include a pair of rear cap screws 116 extending therethrough in a position corresponding to that of the clamping screw 48. FIG. 6 also shows that the shaft 118, which includes the knob 92 on the top thereof has the indexing wheel 102 attached thereto by means of a collar 120. Shaft 118 extends through a shaft support bracket 122 equipped with means therein for journaling the shaft 118. A cardioid profile cam 124 is fixedly attached, as by an intergrally formed collar 126, onto the shaft 118, and cam follower means in the form of an adjusting screw 128 has a base portion 130 thereof riding on the outer surfaces of the cam 124. The adjusting screw 128 is held in place by a lock nut 132 which secures it to the mirror support assembly 134, while a coil helper urges the screw 128 into contact with the cam 124.

The mirror support asembly 134 includes fasteners 126 holding a support flange 138, which in turn holds the mirror 140. Fasteners 142 are connected to either end of a leaf spring 144, which connects one end of the support assembly 134 with a projection 146 forming a part of the optical frame 106.

Figure 7:
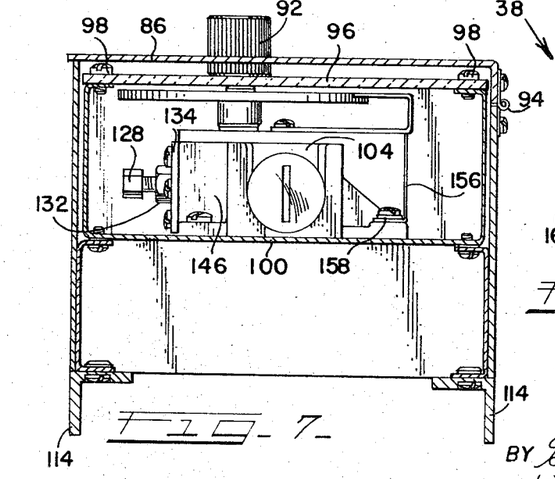
FIG. 7 is a vertical sectional view, taken on lines 7—7 of FIG. 4 showing the monochromator module.
Figure 8:
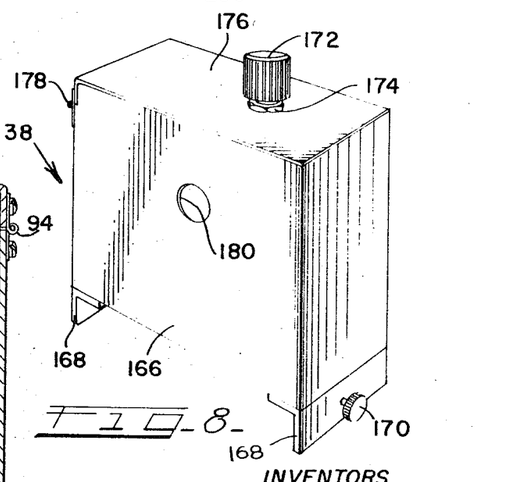
FIG. 8 is an isometric view of the sample compartment module of the invention.

The optical frame 106 includes a slotted holder 148 which supports a first lens 150, a second lens 152, and diffraction means 154 in the form of a grating disposed between the lenses 150, 152. The exit collimating slit 104 has a counterpart in the entrance collimating slit 156, each of the slits 104, 156 being fastened to the optical base 106 by flanges 158. An entrance opening 160 is provided in alignment with the entrance slit 156, and an exit slit 162 is provided which is in alignment with the exit collimating slit 104; the lens unit 164 is placed just in front of the outlet opening 162.

Although the operation of the monochromator unit just described is further discussed below, it can be seen that the mirror 140 held on the support assembly 134 is adapted to be moved through an angle as the dial 102 and the cam 124 associated therewith are rotated, and that, as a result, light entering the entrance 160 and passing to the slit 156 will be reflected at varying angles by the mirror 140, thereby striking the diffraction grating 154 at different angles, with the result that a beam of light having a selected wave length will be focused on the exit collimating slit 104, before passing through the exit lens 164 and the opening means 162 in the monochromator housing 84.

The cam 124, in a preferred embodiment, is in the general shape of a cardioid, because the indicia 112 on the dial 102 are equally spaced apart or linearly calibrated. The cardioid cam profile results in altering the angular change of the mirror from a non-linear function to a linear function, the cardioid being a projection thereof on a flat surface. The provision of the leaf spring 144 affords simplicity in operation, and affords vertical stiffness, whereas the helper spring 135 provides means for biasing the mirror support 134 against the cam unit 124.

The optical base unit 106 provides a simple and inexpensive support and alignment means for the optical components held therein and attached to the frame unit 100 and also serve to simplify the alignment of these components in respect to each other, especially during manufacture or maintenance.

SAMPLE COMPARTMENT MODULE

Figure 9:
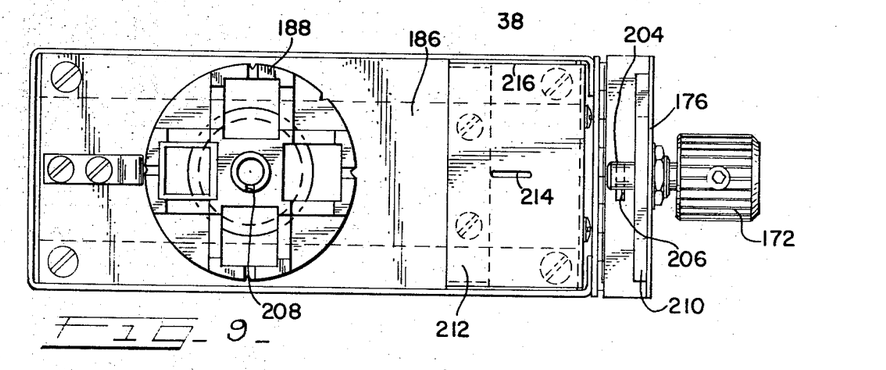
FIG. 9 is a top plan view of the sample compartment module of FIG. 8 with the top cover thereof raised, and showing the holder unit therein.
Figure 10:
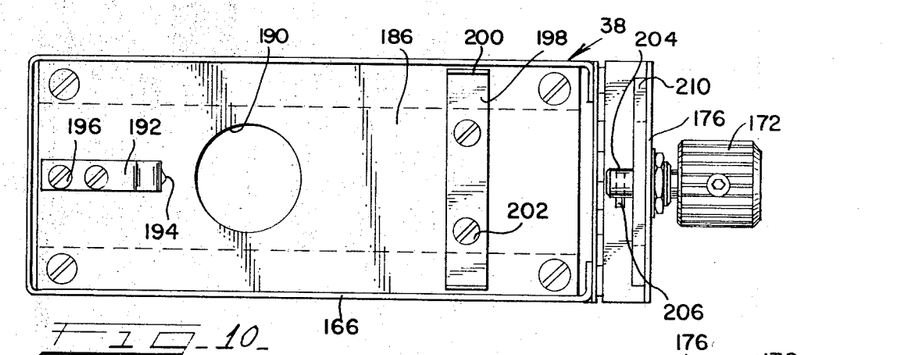
FIG. 10 is a top plan view of the sample compartment module of FIG. 9 showing the interior thereof with the sample holder removed therefrom.
Figure 11:
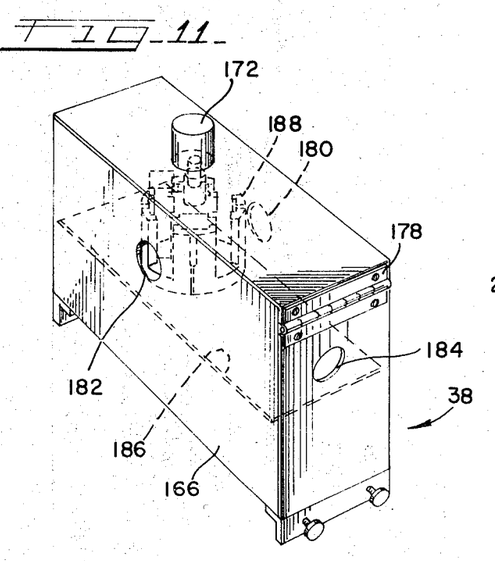
FIG. 11 is an isometric view of the sample compartment module taken from the rear thereof.

Referring now to FIGS. 8–12, inclusive, there is shown a sample compartment module 38. This module 38 includes housing means 166, leg members 168, a front locking screw 170, and a rotatable knob 172, locked by a nut 174 into a top cover 176, which is mounted atop the housing 166 by a hinge 178. An opening 180 is shown in one side wall of the unit, for allowing passage of light therethrough. Referring to FIG. 11, it is shown that the entrance opening means 180 has a counterpart or exit opening 182 on the opposite side of the housing 166, as well as a third opening 184 on an end wall of the housing 166.

FIG. 11 also shows that a floor unit 186 is provided for rotatably supporting a holder unit 188, the construction of which will be described in detail below. Referring to FIGS. 10 and 11, it is shown that the floor element 186 includes a circular opening 190 therein for removably receiving the sample or filter holder unit 188. A spring unit 192 having a point 194 protruding therefrom is secured by fasteners 196 to the floor 186, and a light shield support bracket 198 having vertically extending legs 200 is held by fasteners 202 onto the floor unit 186 of the sample compartment module 38.

Referring particularly to FIGS. 9 and 10, it can be seen that a shaft 204 extends inwardly through the cover member 176 of the module 38, and that the shaft includes a key 206 extending outwardly therefrom, the key 206 being adapted to be received in a keyway slot 208 in the holder 188, to prevent relative rotation between the shaft 204 and the holder 188. Light excluding means in the form of a sponge rubber gasket 210 are provided on the interior face of the cover unit 176, so that when the cover is lowered into position, extraneous light will not be allowed to enter the interior of the sample module 38. Referring again to FIG. 9, there is shown a hingedly mounted light shield unit 212, having a collimating slit 214 therein, as well as a side wall opening shield member 216, the purpose of which will be described in detail later herein.

SAMPLE HOLDER UNIT

Referring now to FIGS. 12 through 17, the sample unit holder 188 and a typical cuvette or other sample holder means 218 are shown. In a preferred embodiment, this holder unit 188 includes a lower cylindrical projection 222, adapted to be received in the opening 190 in the floor 186 of the sample compartment 38. A plurality of detent means in the form of notches 224 are provided, each being located on the outer periphery of the holder 188, and being adapted to be engaged by a locking means or point 194 on the spring unit 192. The shaft 220 of the holder 188 includes a keyway 208 therein, as shown.

Figure 12:
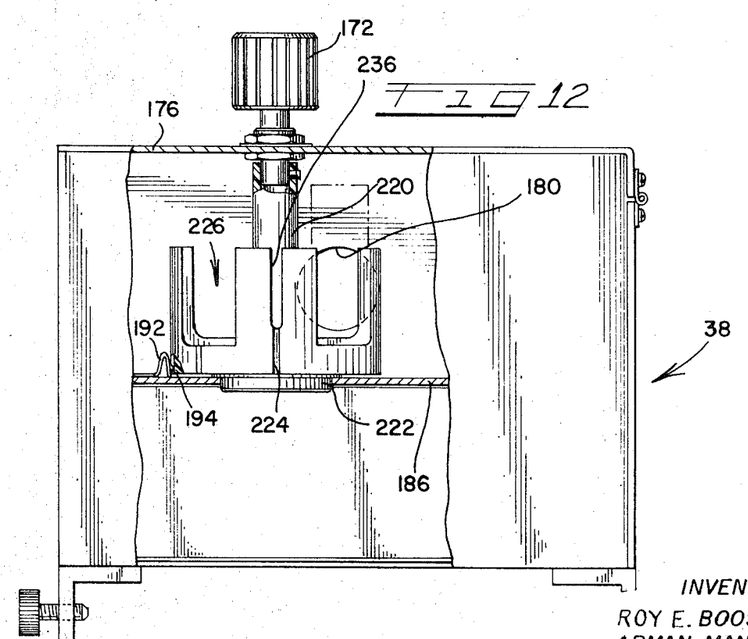
FIG. 12 is a side view, partly in elevation and partly in section, showing the sample compartment module with the holder unit in place therein.
Figure 13:
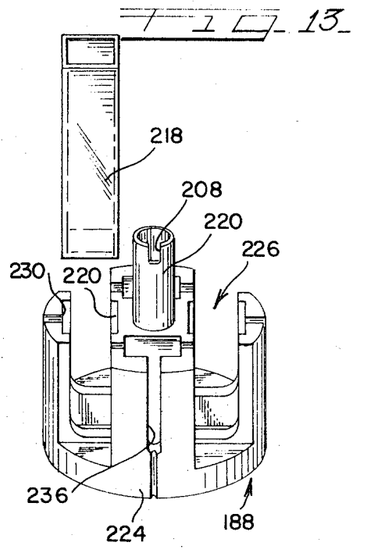
FIG. 13 is a view, on an enlarged scale, of the cuvette and holder unit assembly of the invention, showing the cuvette element in an exploded relation.
Figure 14:
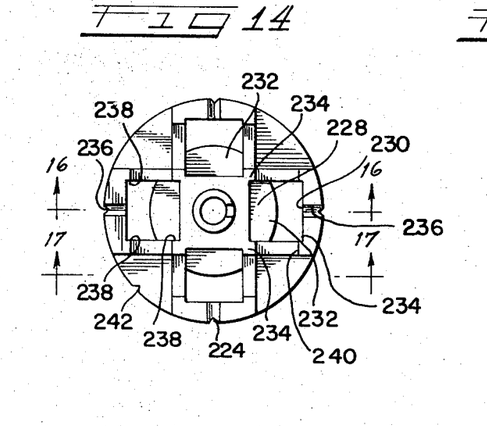
FIG. 14 is a top plan view of the holder unit of the invention.
Figures 15, 17, 17A:
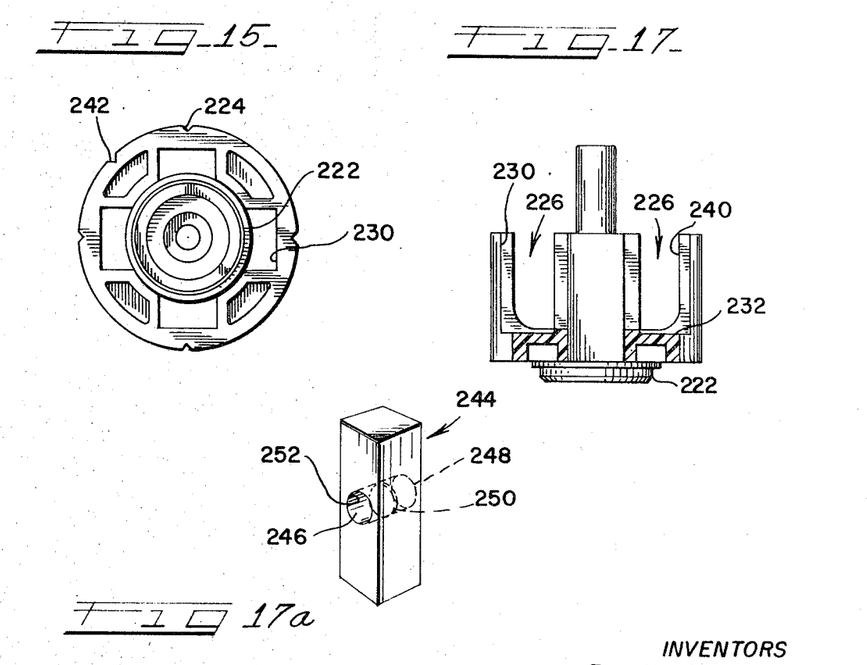
FIG. 15 is a bottom plan view of the holder unit of the invention.
FIG. 17 is a vertical sectional view, taken along lines 17—17 of FIG. 14.
FIG. 17a is an isometric vew of a filter element of the invention.
Figure 16:
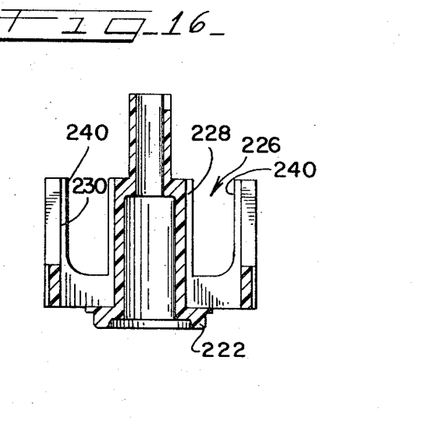
FIG. 16 is a vertical sectional view of the holder unit, taken along lines 16—16 of FIG. 14.

Referring now to FIGS. 12, 16 and 17, it can be seen that a plurality of compartments 226 are provided for removably receiving light transmitting elements, in this case, sample holder cuvettes 218, therein, and these compartments 226 are made up of inner walls 228, outer walls 230, and bottom support walls 232. Both the inner and outer walls 228, 230 have flanges 234 on the ends thereof, the flanges 234 being spaced apart from each other. In addition, a slot 236 extends at least partially downwardly of the outer wall portion 230. The inner edges of the flanges 234 serve to define partial, spaced apart side walls 238 disposed at right angles to the inner and outer walls 228, 230. Thus, a cuvette unit 218 may be received in a holder unit 188, and the flanges 234 will overlap the edge portions of the cuvette 218 sufficiently to lock the same in place but in a manner so that apertures 226 extending between the faces 240 of the flanges 234 will allow passage of light therethrough.

In operation, a plurality of cuvettes 218 are disposed in position inside the holders 188, and thereafter, the holder 188 is positioned with the cylindrical extension 222 thereof fitted snugly but slidingly into the opening 190 of the floor 186 of the sample compartment 38. Thereafter, when the cover 176 of the module 38 is closed, the key 206 engages the keyway 208 in the shaft 220 of the holder, and rotation of the knob 172 rotates the cuvette holder 188 successively into a plurality of positions with the apertures 226 formed between the faces 246 of the flanges being aligned with the pairs of openings 180, 182 in the housing portion 166 of the module 38. Thus, a beam of light propagated therethrough will pass through the cuvette holder and any sample liquid contained therein, and out the other opening, in order to have the intensity or other characteristics thereof responded to by the detector means placed adjacent thereto.

The detent means in the form of notches 224 cooperate with the spring 192 and the point thereon so that the holder 188 is indexed into the desired position allowing passage of light therethrough. The provision of the extra detent notch 242 (FIG. 15) is made so that initial readings may be taken when no light is allowed to be transmitted between the openings 180, 182. Thus, referring to FIG. 11, it is shown that the holder 188 is in such a position, that is, in the case of a holder having four compartments, at a 45° angle with respect to anyone of its normal locked-in positions spaced 90° apart.

Referring now to the dimensions of the unit 188, relative sizes are not critical, except that in some cases, referring to the outer walls 230, and the provisions of the slots 236 therein, it is desired that the thickness of the material comprising the walls 230 exceeds the width of the slot 236, so that when the holder 188 is placed in the 45° angle position referred to above, no light can pass through this slit, since, in this orientation, the slit itself is deeper than it is wide.

Nevertheless, as will appear more fully herein, it is desired to have a slit in the position shown, since it is desired to direct a light beam therethrough when the sample compartment is used as a nephelometer, whereas it is desired to exclude light therefrom when the holder 188 is being used as a part of a spectrophotometer and is in the position shown in FIG. 11. Thus, the holder unit shown has a number of novel advantages and characteristics which render it particularly suitable for use in a modular system of the type shown. In addition to the zero light transmission setting for a 45° position referred to above, the additional detent notch 242 provides a convenient method of allowing the indexing of the exterior knob 172 so that if a consecutive plurality of samples is desired to be analyzed, the process is facilitated because there is always a ready reference mark provided for locating the relative position of the first sample.

Another advantage of the holding unit just described is that this construction facilitates the interchange between cuvette units 218 and optical filter units 244, such as those shown in FIG. 17a.

FILTER COMPARTMENT MODULE

Referring now to FIG. 1, a filter module 36 is shown, and although this unit is not otherwise shown in the drawings, except in schematic views to be described later, it will be understood that the filter compartment module is identical in all respects to the sample compartment module which is described, except that the light shield unit 212 and the end wall opening 184 need not be provided. Otherwise, the only difference between the filter unit and the sample compartment unit resides, not in the construction of these units, but in the type of insert placed in the compartments 226 of the holder 188, the indicia printed on the cover, and other portions not novel in themselves.

Thus, referring to FIG. 17a there is shown a light emitting filter element 244, of a generally rectangular prismatic shape, and this filter element 244 includes an entrance aperture 246, an aperture 248, and a Wratten or like colored optical filter unit 250 located in the cylinder 252 formed between the two openings 246, 248. Thus, as is well known, the insertion of a filter 250 of any desired standard color, converts a solid block of plastic, metal, or the like into a filter unit having an aperture therethrough which may receive a beam of light propagated from the light source directly or from the light source module through the monochromator unit.

LIGHT SHIELD

Figures 18, 19, 20:
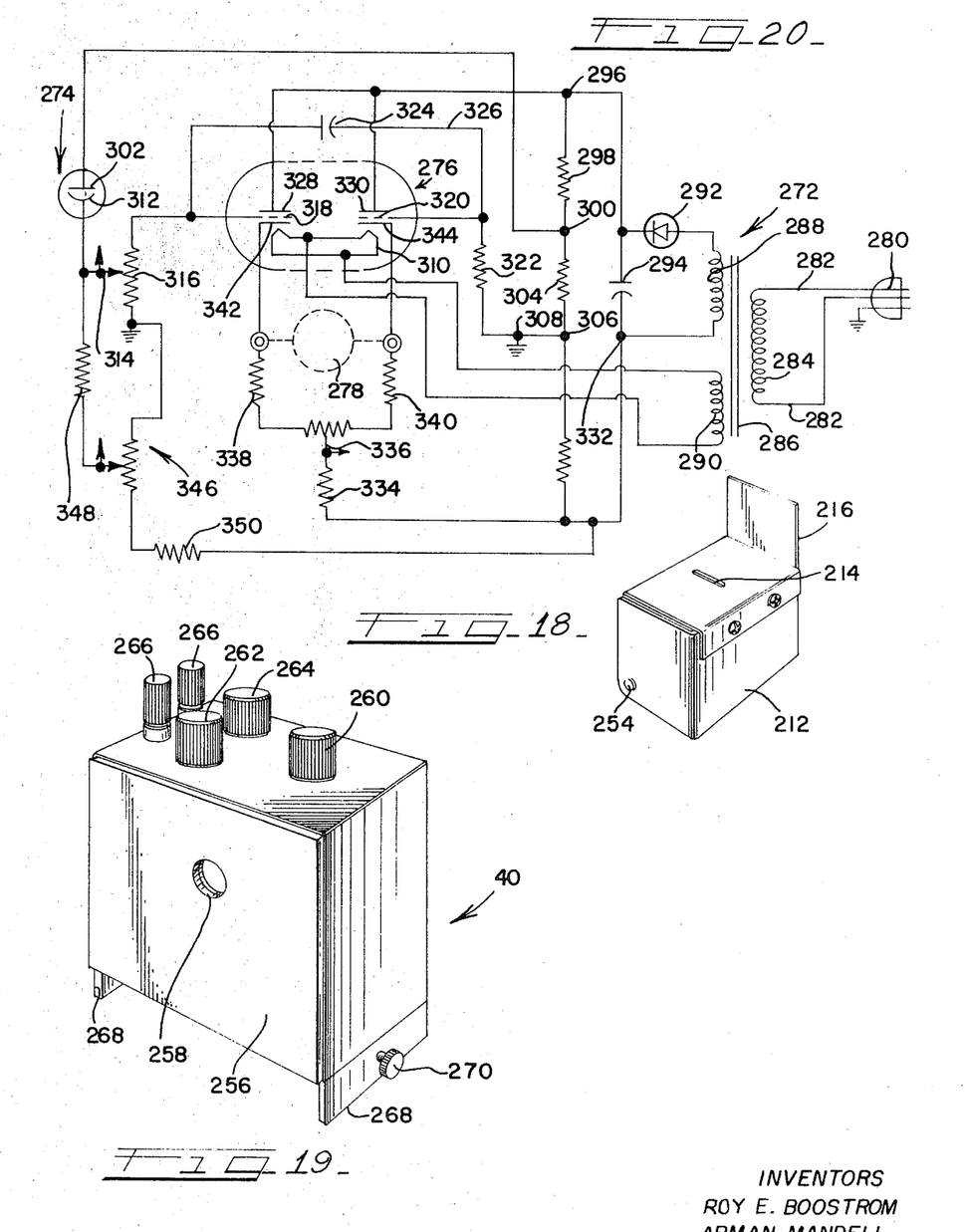
FIG. 18 is an isometric view of the sample compartment light shield.
FIG. 19 is an isometric view of the detector module of the invention.
FIG. 20 is an electrical schematic view showing the power supply, photoresponsive detector means, amplifier and meter unit therefor.

Referring now to FIG. 18, the light shield assembly 212 is shown in greater detail. It can be seen that this unit includes the slit 214 described above, and the side wall opening shield 216, and that pivot points in the form of small projections 254 are provided for engagement with corresponding openings in the vertical legs 200 of the flange 198. The significance of this shield unit and the manner of its functioning will be described further herein.

DETECTOR MODULE

Referring now to FIGS. 19 and 20, FIG. 19 illustrates the detector module 40 and FIG. 20 is a simplified schematic illustration of the operations of this unit. As shown in FIG. 19, the housing means 256 of the detector 40 includes an opening 258 therein for receiving a light beam, and this unit also includes a "reference" knob adjustment 260, a "blank" adjustment knob 262, and a "zero" adjustment knob 264, as well as two binding parts 266, for receiving electrical connectors. At the bottom of the housing 256 of the detector module 240 are disposed leg elements 268, the front leg being shown to include a removal and locking screw means 270.

The function of the detector module is to receive energy from the power supply unit 46 shown in FIG. 1, and from the light source module 32, and to use the power supply energy to amplify the energy received in the detector from the light source for display on means such as the meter shown at 42 in FIG. 1. The manner in which this is carried out, will be set forth below.

Referring now to FIG. 20, there is shown a power supply unit 272, a photodiode 274, amplifier means 276, and display means 278 in the form of a meter, recording potentiometer and pen, or the like.

In a preferred embodiment, 115 volts alternating current is supplied from the plug 280, through two leads 282, to a primary winding 284 which is inductively coupled through a permeable core 286 to secondary windings 288, 290 containing different numbers of turns. The first secondary winding 288, is preferably wound so as to produce 90 volts, and rectifier means in the form of a diode 292 or the like is provided to rectify the alternating current induced in the secondary winding 288. A capacitor 294 is provided to eliminate pulses in the resulting direct current. If desired, further choke coils and additional capacitors may be provided. At junction 296, 90 volts positive polarity DC is impressed, and a dropping resistor 298 provides ten volt positive potential at the junction 300, which is impressed on one terminal 302 of the photodiode 274. A further dropping resistor 304 is connected through a junction 306 to the ground 308.

The secondary winding 290 is tapped to provide six volts of alternating current for heating the filaments 310 of the amplifier 276, which is preferably in the form of a selected and aged so-called "duo-triode" tube, such as a 12AU7A tube. The other terminal 312 of the photodiode 274 is connected, through a "reference" potentiometer 314 to a grid resistor 316 connected to one grid 318 of the amplifier 276, while the other grid 320 of the ampilifier 276 is connected through a resistor 322 to ground at 308. A capacitor 324 is placed in the lead 326 which connects the two grids 318, 320, preventing flow of direct current therebetween. Both plates 328, 330 of the amplifier 276 are connected at the junction 296 to the 90 volt positive DC plate potential. A second terminal 332 attached to the secondary winding 288 connects a 40 volt negative potential, through a resistor 334, to a "zeroing" potentiometer 336, which serves as a voltage divider between two cathode resistors 338, 340. Thus, adjustment of the "zero" adjustment or potentiometer alters the voltage on the two cathodes 342, 344, of the common amplifier 276. The display means in the form of a meter 278 is connected across the output of the resistors 338, 340.

A third potentiometer 346 is connected to one terminal 312 of the photodiode through a resistor 348, and through a resistor 350 to a terminal which also receives the 40 volt negative DC potential. This potentiometer 346 is the "blank" adjusting potentiometer.

In operation, it may be seen that as electronic energy in the form of photons is directed to and all on the phototube, it emits electrons in response to the intensity of the incident beam, and becomes more or less conductive, and current flowing therethrough is fed through the potentiometer 314, impressing a given voltage onto the grid 318 of the amplifier tube 276. As a bias is impressed on the grid 318 which differs from the bias impressed on the grid 320, which is held at a constant potential, it is obvious that more current will tend to flow from the cathode 342 to the plate 328, than from the cathode 344 to the plate 330. The differing potential thus establishes the relative amounts of current flowing in each electrode pan, and this will be reflected in the reading of the meter 278, since some current will tend to form the output of the resistor 340 through the meter 278 to the plate 328 as well as to the plate 330, if the path thereby established offers less resistance, by reason the bias placed on the grid 318. The "zeroing" potentiometer 336 is adjusted so that when little or not current is flowing in the phototube circuit, the inter-electrode resistance between the pairs of cathode-plate connections 342, 328 and 344, 330 is the same.

Thus, the function of the 12AU7A tube is that of receiving the signal or varying voltage from the phototube across one grid thereof, and modulating the current flowing in one of the cathode-to-plate circuits of the tube 276. When such current difference is measurable, a reading is obtained on the meter 278, which is connected across to the cathodes 342, 344.

In place of the meter 278, which is ordinarily a 200 microampere meter, a recording potentiometer or the like may be inserted, suitably connected, as is well known to those skilled in the art.

The "reference" potentiometer is used to adjust the circuit for the effect of placing a so-called "reference" cuvette in the sample compartment in the path of the light. In this way, setting the meter at a value of 100.0 give a proper reference for other readings.

The "zero" potentiometer adjustment balances current flow in the cathode plate circuits and creates zero current in the meter when the light path to the detector is blocked.

The "blank" potentiometer is not used in colorimetric or spectrophotometric measurements, but may be adjusted to alter the conductance or threshold of the photodiode. Since this potentiometer and the "reference" potentiometer are in parallel, adjustment of one affects the preset as desired before adjusting the "reference'" potentiometer.

Figure 21:
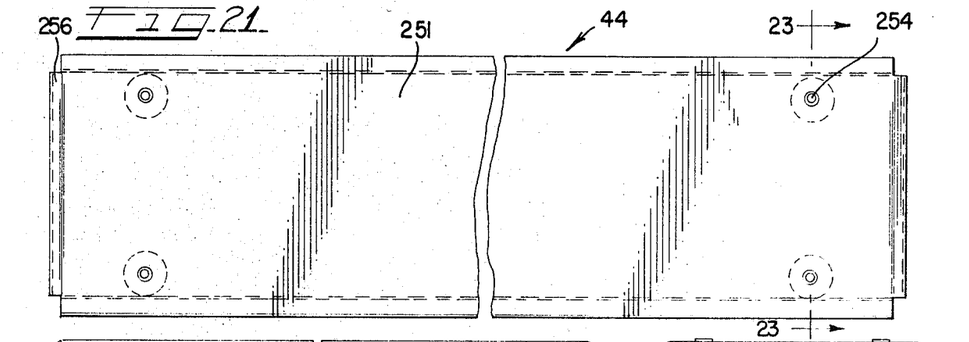
FIG. 21 is a top plan view, showing certain portions of the base unit for supporting some of the modules of the present invention.
Figure 22:
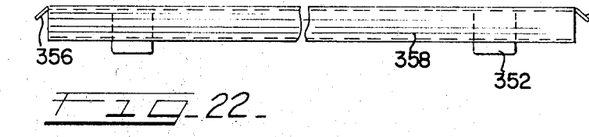
FIG. 22 is a side elevational view of certain portions of the base of unit shown in FIG. 21.
Figure 23:
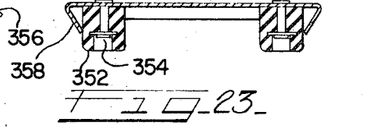
FIG. 23 is a vertical sectional view of the base unit, taken on lines 23—23 of FIG. 21.

Referring now to FIGS. 21–23, the base unit 44 is shown, and this unit includes a generally flat top surface portion 351, a plurality of rubber leg units 352 supported by fasteners 354 extending through the top surface 350 thereof. These views show that somewhat inclined ramp units 356 are provided for either end of the base unit 44 to facilitate placing modules thereon and removing them therefrom. It can also be seen, particularly in reference to FIG. 23, that the side wall portions 358 which engage the adjusting and mounting screws are tapered, and this construction serves to assure that the module supported on the base will not only be aligned, but will be moved vertically into a closely overlying position in relation to the top surfaces 351 of the base 44.

The base 44 is sufficiently long to allow room for all the modules described above to be disposed in the varying relations to be further described below.

Figure 24:
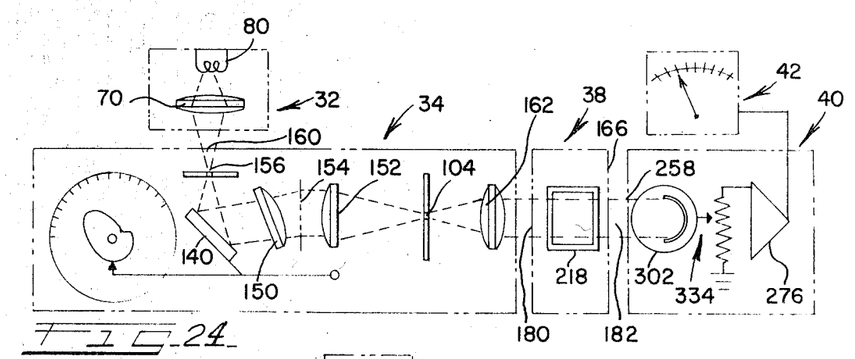
FIG. 24 is a diagrammatic view, showing the operation of the modules of the present invention when assembled to form a spectrophotometer unit.
Figure 25:
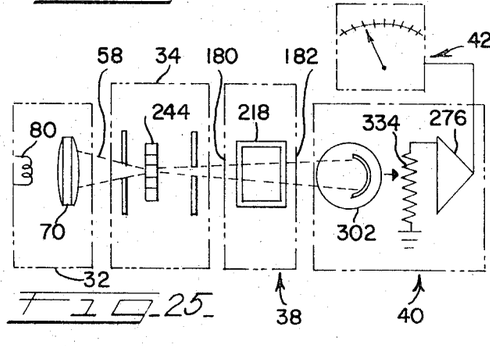
FIG. 25 is a diagrammatic view showing the modules of the present invention assembled to form a filter colorimeter.
Figure 26:
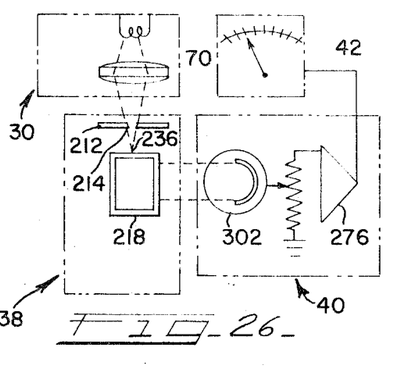
FIG. 26 is a diagrammatic view showing the modules of the present invention assembled to form a nephelometer.

Referring now to FIGS. 24 through 26, inclusive, these diagrammatic views illustrate the manner in which various optical analytical instruments may be made by assembling the modules of the present invention in various combinations.

Thus, referring to FIG. 24, it is diagrammatically shown that the light source module 32, is attached to the side wall surface of the monochrometer 34, so that the bulb unit or light source means 80 is directed through the lens 70 and through opening means 160 in the side wall of the monochrometer 34, and is propagated through the entrance slit 156. Thereupon, the light beam is reflected from the movably mounted mirror 140 through the lens 150 and onto the diffraction grating 154, before being focused by the lens 152 onto the collimating exit slit 104, from where it is propagated through the exit lens 162. Thus, movement of the mirror changes the angle of incidence of the light rays falling on the diffraction grating 154, and the portion of the spectrum thus created is moved in relation to the slit 104. The monochromatic beam thus generated, in a preferred embodiment of the invention, has a band width of approximately 20 millimicrons, which is sufficiently narrow for precise analytical work.

This beam is condensed on lens 162, whereupon the output of the monochromatic beam is then directed through a cuvette or like sample holder means 218 which is located between the openings 180, 182 in the side wall portions 166 of the sample compartment 38. Since FIG. 24 is a diagrammatic view, only a single cuvette 218 is shown and the size thereof is reprsented as being relatively larger. The beam emerging from the sample compartment 38 is directed through the opening means 258 in the detector module 40, and then directed to the photodiode tube 302, or other suitable means which are electronically responsive to light energy falling thereon. The detector module 40 is shown schematically to include an amplifier 276 and a potentiometer means 334. The output from the amplifier unit 276 is directed to the visible display means in the form of a meter 42, which, as pointed out, reads out in proportion to the current shunted from one cathode of the amplifier tube to the other cathode.

Referring to FIG. 25, it is shown that the light source module 32, including the filament 80 and condensor lens 70, are disposed with the opening in the tube 58 facing an opening in the filter compartment 36, which contains one or more filter elements 244. The output is then directed through the two openings 180, 182, in the sample compartment 38, and thus through a sample held in the cuvette 218. The light striking the photo-diode 302 causes unbalanced current flow in the amplifier 276, and the amount of current flow is reflected in the reading displayed on the meter 246. This engagement of the modules produces a filter colorimeter wherein the light source, the filter and sample compartments 36, 38, and the detector means 40 are all in a parallel alignment. As pointed out above, filter elements 244 having different filter lenses 250 therein are generally moved successively from position to position, and the resulting readings are then plotted graphically.

Referring to FIG. 26, an arrangement of the light source module 32, the sample container 38, detector module 40, and meter means 42, is illustrated in which the instrument formed is a nephelometer.

In this arrangement, the photo tube 302 of the detector 40, impresses a voltage on one grid of the amplifier 276 in proportion to the light scattered by a sample held in the cuvette 218, when the light is fed through a slit 214 in the light shield 212, and through a slot 236 in the holder 188, from the container lens 70, module 32. This voltage results in current flow through the meter 42, as pointed out above.

As is well known, nephelometry relates to the measurement of light scattered at right angles to an incident beam by collidal or other fine particles suspended in the solution.

This method is somewhat similar to turbidimetry, that is, measurement of light passing directly through a sample having agglomerated particles therein.

Thus, the above illustrations show the capacity of the modular system to form a number of different analytical instruments from modules which simplify teaching of theories and operational principles by reason of their novel constructions.

It will thus be seen, as set forth above, that the present invention provides a novel combination teaching aid and modular instrumental analysis system and components therefor, having a number of advantages and characteristics, including those referred to herein and others which are inherent in the invention.

We contemplate, that numerous modifications of this invention may be made by those skilled in the art without departing from the spirit of the invention or the scope of the appended claims.

We claim:
1. A combination teaching aid and modular instrumental analysis system comprising, in combination, a light source module for producing light, said light source module including housing means, light emitting means disposed in said housing means, opening means in said housing means for allowing a light beam emanating from said light emitting means to exit from said housing means, and fastening means for removably attaching said light source housing means to another module of said analysis system, a sample compartment module for receiving at least one sample container of a material to be analyzed, said sample compartment module including housing means, opening means in the walls thereof for allowing entry and exit of at least portions of a light beam, and holder means for holding at least one container of a sample to be analyzed in position in said housing, a detector module for receiving at least a portion of a beam of light directed from said light source module into said sample compartment module, and from said sample compartment module into said detector module, said detector module including photo-responsive means therein having an output which is adapted to be displayed and which is variable in response to the variation in a characteristic of light in said portion of said light beam, and a base unit for supporting at least some of said modules, said base unit having a longitudinal extent substantially parallel to the direction of propagation of said light beam into said detector means, and including parallel edge portions extending longitudinally of said base unit, at least some of said modules having means thereon for adjusting the angular alignment of said modules in relation to the longitudinal axis of said base unit, for allowing longitudinal movement of said modules along said base unit and for clamping said modules in position on said base unit, said means for adjusting the alignment of said modules including, for each such module, a pair of spaced apart adjusting screw means extending through a portion of one side of the housing means of said module, and a screw means extending through said housing on an opposite side thereof, whereby adjustment of said pair of spaced apart adjusting screw means adjusts the angular alignment of said module and said single screw means allows locking onto, sliding along, and removal from said base unit.

2. A combination system as defined in claim 1 in which said light source module includes optical condenser means for directing light from said light emitting means through said opening means in said module onto a desired target area.

3. A combination system as defined in claim 1 in which said sample compartment includes means therein for holding a container of a sample to be tested against movement of said sample container during the time an analysis reading is taking place.

4. A combination system as defined in claim 1 in which said holder means for holding a sample container includes said cuvette holder and at least one cuvette removably received therein, said holder comprising a generally cylindrical main body portion with support means extending from the bottom thereof and rotatably mounting said holder means, and at least one cuvette accommodating compartment, said compartment being defined by radially inner and outer side wall portions, each of said side walls having means thereon for engaging portions of a cuvette to be held therein, and wherein the outer edge portions of said means for engaging said portions of said cuvette are spaced apart a distance substantially equal to the inside dimensional width of a cuvette held in such compartment, and wherein said holder includes means circumferentially spaced apart on said body in registry with said cuvette compartments for receiving a detent and locating said rotary holder in position.

5. A combination system as defined in claim 1 in which said opening means in said walls of said sample compartment module comprises two oppositely disposed openings in the side walls of said housing means for allowing a beam of light to be propagated therethrough, a third opening in an end wall for allowing a beam of light to be propagated therethrough, and light shield means disposed in said sample compartment module for alternately opening and closing one of said openings in said side wall and said opening in an end wall, whereby, upon movement of said light shield means, light may be directed in a straight line through a sample held in said compartment, and may be directed through said opening in said end wall onto said sample, and be scattered therefrom outwardly through one of said openings in said side wall.

6. A combination system as defined in claim 1 in which said housing means of said sample compartment module includes a top cover portion which may be raised and lowered for viewing the interior of said compartment, and in which said top cover of said housing means includes knob means on the top thereof attached to a shaft extending through said top portion cover, said shaft having orienting key means thereon for engagement with a keyway of a sample holder disposed beneath said top member, and wherein said top cover and said knob include cooperative indicia for indicating the relative positions thereof.

7. A combination system as defined in claim 1 which further includes a filter compartment module comprising housing means, means for receiving a holder unit for containing a plurality of filter elements, opening means in the side walls of said housing means for allowing a beam of light to pass therethrough substantially perpendicular to said walls in a desired relation to said means for containing said filter elements.

8. A combination system as defined in claim 1 which system further includes a monochromator module adapted to be mounted to said base unit.

9. A combination teaching aid and modulator instrumental analysis system comprising, in combination, a light source module for producing light, said light source module including housing means, light emitting means disposed in said housing means, opening means in said housing means for allowing a light beam emanating from said light emitting means to exit from said housing means, and fastening means for removably attaching said light source housing means to another module of said analysis system, a sample compartment module for receiving at least one sample container of a material to be analyzed, said sample compartment module including housing means, opening means in the walls thereof for allowing entry and exit of at least portions of a light beam, and holder means for holding at least one container of a sample to be analyzed in position in said housing, a detector module for receiving at least a portion of a beam of light directed from said light source module into said sample compartment module, and from said sample compartment module into said detector module, said detector module including photo-responsive means therein having an output which is adapted to be displayed and which is variable in response to the variation in a characteristic of light in said portion of said light beam, and a base unit for supporting at least some of said modules, said base unit having a longitudinal extent substantially parallel to the direction of propagation of said light beam into said detector means, and including parallel edge portions extending longitudinally of said base unit, at least some of said modules having means thereon for adjusting the angular alignment of said modules in relation to the longitudinal axis of said base unit, for allowing longitudinal movement of said modules along said base unit and for clamping said modules in position on said base unit, said opening means in said walls of said sample compartment module including two oppositely disposed openings in the sidewalls of said housing means for allowing a beam of light to be propogated therethrough, a third opening in an end wall for allowing a beam of light to be propagated therethrough, and a light shield means disposed in said sample compartment module for alternately opening and closing one of said openings in said sidewall and said opening in an end wall, whereby, upon movement of said light shield means, light may be directed in a straight line through a sample held in said compartment, and may be directed through said opening in said end wall onto said sample and scattered therefrom outwardly through one of said openings in said sidewall.

10. A combination teaching aid and modular instrumental analysis system comprising, in combination, a light source module for producing light, said light source module including housing means, light emitting means disposed in said housing means, opening means in said housing means for allowing a light beam emanating from said light emitting means to exit from said housing means, and fastening means for removably attaching said light source housing means to another module of said analysis system, a sample compartment module for receiving at least one sample container of a material to be analyzed, said sample compartment module including housing means, opening means in the walls thereof for allowing entry and exit of at least portions of a light beam, and holder means for holding at least one container of a sample to be analyzed in position in said housing, a detector module for receiving at least a portion of a beam of light directed from said light source module into said sample compartment module, and from said sample compartment module into said detector module including photo-responsive means therein having an output which is adapted to be displayed and which is variable in response to the variation in a characteristic of light in said portion of said light beam, and a base unit for supporting at least some of said modules, said base unit having a longitudinal extent substantially parallel to the direction of propagation of said light beam into said detector means, and including parallel edge portions extending longitudinally of said base unit, at least some of said modules having means thereon for adjusting the angular alignment of said modules in relation to the longitudinal axis of said base unit, for allowing longitudinal movement of said modules along said base unit and for clamping said modules in position on said base unit, said housing means of said sample compartment module including a top cover portion adapted to be raised and lowered for viewing the interior of said compartment, knob means on said top cover of said housing means attached to a shaft extending through said top cover, said shaft having orienting key means thereon for engagement with a keyway of a sample holder disposed beneath said top member, said top cover and said knob means including cooperative indicia for indicating the relative positions thereof.

11. A combination teaching aid and modular instrumental analysis system comprising, in combination, a light source module for producing light, said light source module including housing means, light emitting means disposed in said housing means, opening means in said housng means for allowing a light beam emanating from said light emitting means to exit from said housing means, and fastening means for removably attaching said light source housing means to another module of said analysis system, a sample compartment module for receiving at least one sample container of a material to be analyzed, said sample compartment module including housing means for allowing a light beam emanating from allowing entry and exit of at least portions of a light beam, and holder means for holding at least one container of a sample to be analyzed in position in said housing, a detector module for receiving at least a portion of a beam of light directed from said light source module into said sample compartment module, and from said sample compartment module into said detector module, said detector module including photo-responsive means therein having an output which is adapted to be displayed and which is variable in response to the variation in a characteristic of light in said portion of said light beam, a base unit for supporting at least some of said modules, said base unit having a longitudinal extent substantially parallel to the direction of propagation of said light beam into said detector means, and including parallel edge portions extending longitudinally of said base unit, at least some of said modules having means thereon for adjusting the angular alignment of said modules in relation to the longitudinal axis of said base unit, for allowing longitudinal movement of said modules along said base unit and for clamping said modules in position on said base unit, and a filter compartment module which includes a housing, said filter compartment module also including means for receiving a holder unit adapted to contain a plurality of filter elements, opening means in the sidewalls of said filter compartment module housing for allowing a beam of light to pass therethrough substanly perpendicular to said walls in a desired of relation to said means for containing said filter elements.

References Cited

UNITED STATES PATENTS

| | | | |
|---|---|---|---|
| 2,436,145 | 2/1948 | Johnson | 356—103 |
| 2,669,899 | 2/1954 | Macleish | 356—100 |
| 2,715,851 | 8/1955 | Derr | 356—73 |
| 3,011,391 | 12/1961 | Fastie | 356—100 |
| 3,235,974 | 2/1966 | Hall et al. | 35—19 |
| 3,344,702 | 10/1967 | Wood et al. | 356—246 |

RONALD L. WILBERT, Primary Examiner

V. P. McGRAW, Assistant Examiner

U.S. Cl. X.R.

35—19; 250—226; 356—184, 246

UNITED STATES PATENT OFFICE
CERTIFICATE OF CORRECTION

Patent No. 3,554,648                    Dated January 12, 1971

Inventor(s)  R. E. Boostrom et al

It is certified that error appears in the above-identified patent and that said Letters Patent are hereby corrected as shown below:

Column 1, line 18, "place" should be --placed--

Column 4, line 17, "modules" should be --module--

Column 4, line 24, "monochlorator" should be --monochromator--

Column 6, line 12, "asembly" should be --assembly--

Column 6, line 12, "126" should be --136--

Column 10, line 30, "give" should be --gives--

Column 13, line 37, "modulator" should be --modular--

Column 14, line 31, after "module" insert the following --, said detector module--

Column 14, line 60, "housng" should be --housing--

Column 14, line 67, after "means" insert --, openir means in the walls thereof"

Column 14, line 67, delete "allowing a light beam emanating from"

Column 16, line 1, "substanly" should be --substantially--

Column 16, line 2, delete "of"

Signed and sealed this 7th day of March 1972.

(SEAL)
Attest:

EDWARD M. FLETCHER, JR.
Attesting Officer

ROBERT GOTTSCHALK
Commissioner of Patents